United States Patent
Armour et al.

(10) Patent No.: US 8,185,353 B2
(45) Date of Patent: May 22, 2012

(54) DETERMINING COMPUTER SYSTEM USAGE FROM LOGGED EVENTS

(75) Inventors: David J. Armour, Bellevue, WA (US); Jagadeesh Kalki, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1079 days.

(21) Appl. No.: 12/099,155

(22) Filed: Apr. 8, 2008

(65) Prior Publication Data

US 2009/0254313 A1 Oct. 8, 2009

(51) Int. Cl.
*G06F 15/16* (2006.01)

(52) U.S. Cl. .......................................... 702/187

(58) Field of Classification Search .................... 702/187
See application file for complete search history.

(56) References Cited

U.S. PATENT DOCUMENTS

| | | | |
|---|---|---|---|
| 2005/0010572 A1* | 1/2005 | Clark et al. | 707/10 |
| 2005/0183143 A1* | 8/2005 | Anderholm et al. | 726/22 |
| 2006/0224930 A1* | 10/2006 | Bantz et al. | 714/48 |

* cited by examiner

*Primary Examiner* — Cindy H Khuu

(74) *Attorney, Agent, or Firm* — Gonzalez Saggio & Harlan LLP

(57) ABSTRACT

Described is a technology by which logged events such as in a security event log (e.g., within a defined timeframe) are processed to determine logon times and logoff times, which are then used to determine system usage. Logoff times may correspond to an actual logoff event, a shutdown event, or another login. In one example, logon and logoff times determine the combined times that each user of the system was logged on, e.g., a total session time for each user. Multiple users' times may be combined into a total usage time of all users. Each user's combined session time may be evaluated against the total usage time to determine whether any user is a primary user, e.g., by being logged on more than a threshold percentage of the total usage time. A primary user may be identified, or the system determined to be a shared system without a primary user.

19 Claims, 3 Drawing Sheets

_US 8,185,353 B2_

DETERMINING COMPUTER SYSTEM USAGE FROM LOGGED EVENTS

BACKGROUND

Knowing the primary user of a computer system is valuable in enterprise computing environments, as well other computing environments such as retail sites having point-of-sale computer terminals. By way of example, if a problem is detected, a person from technical support needs to find the computer system to service it, and typically a computer system's physical location is associated with its primary user, e.g., in the user's office, computer laboratory and so forth. Further, it may be necessary to contact the user to resolve the issue. Similarly, an asset manager may need to find a computer system to investigate an issue related to the asset, such as for asset reporting, decommissioning an old machine, and so forth.

However, known ways to determine a computer system's primary user and/or determine other system usage information are inadequate and inefficient. For example, one known technique is to determine the user that last logged onto a computer system at issue. Another is to determine who is logged on when an automated inventory is taken. However the last or current person logged onto that computer system may have been or may be a help desk professional or perhaps a one-time or otherwise infrequent user of the system. Further, some computer systems are shared among users, such as kiosks or by worker shifts, whereby a "last-user" or "current-user" type of determination often provides meaningless information.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which logged events are processed to determine logon times and logoff times, which are then used to determine usage of the system. In one example, the logon and logoff times are used (e.g., the differences comprising session times are summed per user) to determine an amount of time that each user of the system was logged on. Logoff times may correspond to an actual logoff event, a shutdown event, or another login event.

The times of the possibly multiple users may be combined into a total usage time representative of how long all users were logged onto the system, e.g., within a defined timeframe. Each user's combined session time may be evaluated against the total usage time to determine whether any user is a primary user of the system, e.g., by being logged on more than a threshold percentage of the total usage time.

In one aspect, logged event data is accessed and scanned to find a logon time associated with a particular user, and to determine a logoff time corresponding to the logon time. A session time is computed for the particular user based upon a difference of the logoff time and the logon time. Other session times for the particular user may be summed into a summed user time for the particular user, and evaluated with similarly obtained session times of other users to determine whether any user is a primary user of the system, and if so, to identify that user.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards processing a system's event log to determine usage data with respect to that system's users. In one example implementation described below, the log comprises a system security event log, such as found in Windows®-based operating systems, having logon and logoff events. The logon and logoff events are processed to determine which users have logged onto the console of the computer and for how long each has been logged on. As can be readily appreciated, the primary user (or users of a shared computer) may be determined from such processing.

Notwithstanding, other information besides a primary user may be obtained from event log processing. For example, usage patterns, times of usage, and other data may be tied to various events in the log including logon and logoff events. Thus, while various examples herein are primarily described with respect to amounts of times users are logged into a system, this is only one aspect of the technology described herein. Further, while the examples are directed towards Windows®-based operating systems having a security event log, any operating system and/or device having a similar log may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
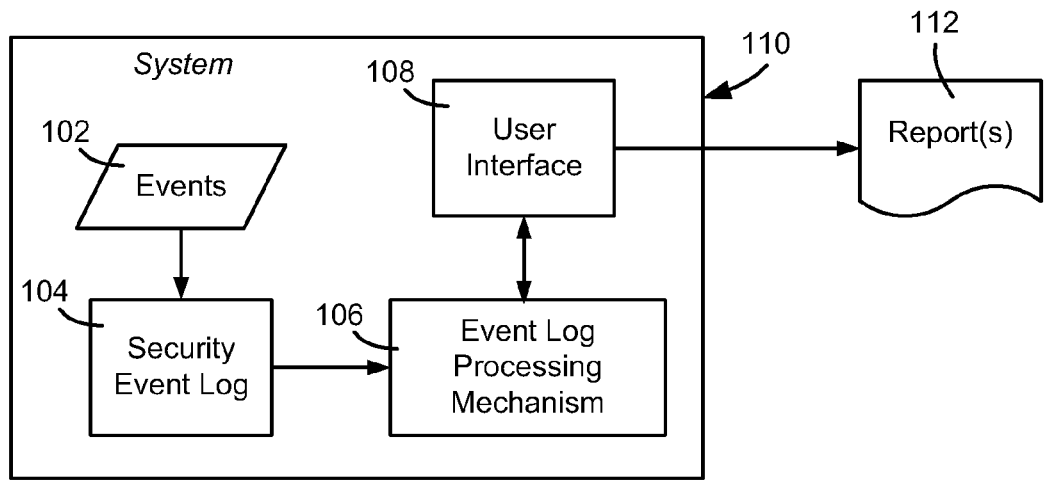
FIG. 1 is a block diagram representing example components related to aspects of processing logged events to determine computer system usage.

Turning to FIG. 1, there is shown a general block diagram including a system 110 in which security-related events 102 including logon and logoff events are logged in a security event log 104. In general, such events are logged as a set of data including a timestamp, an event identifier (ID), a type identifier for that event, and a username and logon identifier. For example, in Windows®-based operating systems, a logon event has an identifier of "528" with types of that event including Interactive [2], RemoteInteractive [10], CachedInteractive [11], and CachedRemoteInteractive [12].

The following sets forth example logon types, of which the example implementation only considers interactive logons (note that Windows® Vista has changed the event IDs by 4096, such that for example Logon is 4624 and LogOff is 4647 or 4634, (whichever comes last); Console access is Type 2 or 10, 11, 12; also UserName is called TargetUserName in the XML:

```
typedef enum _SECURITY_LOGON_TYPE {
    UndefinedLogonType = 0,  // Used to specify an undefined logon type
    Interactive = 2,         // Interactively logged on (locally or remotely)
    Network,                 // Accessing system via network
    Batch,                   // Started via a batch queue
    Service,                 // Service started by service controller
    Proxy,                   // Proxy logon
    Unlock,                  // Unlock workstation
    NetworkCleartext,        // Network logon with cleartext credentials
    NewCredentials,          // Clone caller, new default credentials
    //The types below only exist in Windows ® XP and greater
#if (_WIN32_WINNT >= 0x0501)
    RemoteInteractive,       // Remote, yet interactive. Terminal server
    CachedInteractive,       // Try cached credentials without hitting net.
    // The types below only exist in Windows ® Server 2003 and greater
#endif
#if (_WIN32_WINNT >= 0x0502)
    CachedRemoteInteractive, // Same as RemoteInteractive, this is used
                             // internally for auditing purpose
    CachedUnlock             // Cached Unlock workstation
#endif
} SECURITY_LOGON_TYPE, *PSECURITY_LOGON_TYPE;
```

As represented in FIG. 1 and as described below, an event log processing mechanism 106 processes the logon and logoff events, essentially extracting those in which a user has logged on and off of the system 110 for which the log 104 is maintained. An asset manager or the like (e.g., an administrator) interacts with the event log processing mechanism 106 via a user interface 108, such as to generate a usage report (or reports) 112 with respect to the system. Note that while FIG. 1 shows the various components incorporated into the system 110, it is understood that any or all of these components may be external, such as a remotely coupled log processing mechanism running on a server or service of which the system is a client, for example.

Figure 2:
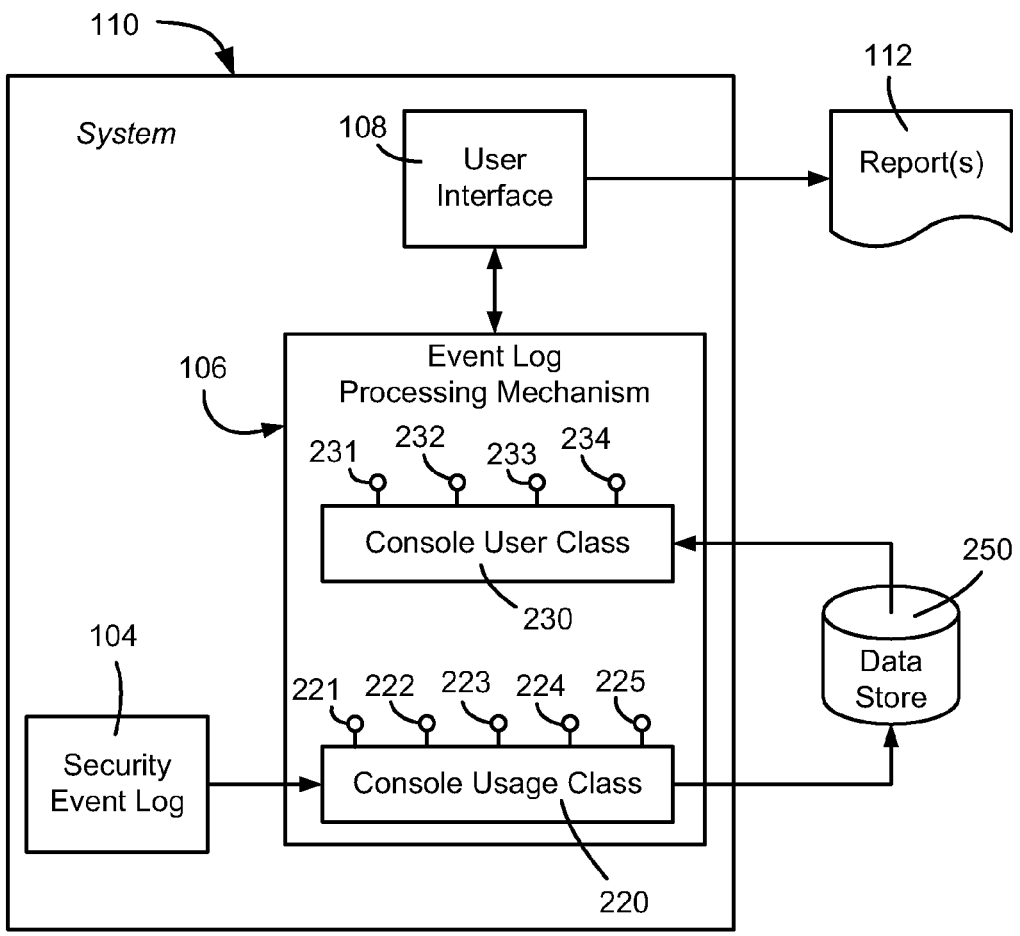
FIG. 2 is a block diagram representing an example implementation for processing logged events and providing access to usage data processed from the events.

FIG. 2 represents an example implementation in which console usage is part of the processing, and console classes provide properties by which the usage data may be accessed. Console usage is a valuable indicator because it requires logging onto the console of the computer at the physical location of the computer using the attached keyboard; (in contrast, Terminal Server for example allows logging on to the "console" remotely, however doing so logs off any other interactive session). Further, only one user can be logged onto the console at a time. Thus, while the security event log 104 records all logon and logoff events, one example implementation considers only interactive console usage for determining a primary user; singular control of the computer system (e.g., corresponding to a console logon) is thus differentiated from other types by tracking console logon/logoff. In alternatives, the system may differentiate other logon types, e.g., there may be many concurrent identities logged on to a machine at a given time while the console user is logged on with singular control and is working, such as automated processes operating in the background, administrators pushing patches, and so forth. Different reports and the like may be generated by filtering such other logged information as desired.

In FIG. 2, the event log processing mechanism 106, such as implemented in a Windows Management Instrumentation (WMI) program that is also coupled to the user interface 108, includes two classes, a console user class 220 and a console usage class 230. In general and as described below, the data is collected by the event log processing mechanism 106 and made available through WMI via the classes 220 and 230. As also described below, the console usage class 220 includes a number of properties 221-225 related to accessing the log data with respect to all users, whereas the console user class 230 provides a number of properties 231-234 related to each particular user. One reason for having separate classes is to minimize duplicate data being collected and transferred. The console usage class 220 may be based on the overall system log data of the console user class 230, e.g., as persisted in a data store 250, in determining the total console users and the top user data information.

The following tables set forth WMI Classes and their properties as an example; (note that any of the property values need not represent the entirety of the log, but may correspond to some subset thereof, such as a particular timeframe within the log as described below):

SMS_SystemConsoleUsage
Class Name: SMS_SystemConsoleUsage
WMI Key: TotalSecurityLogTime

| Property (e.g., 221-225 in FIG. 2): | Description: |
|---|---|
| TotalSecurityLogTime | Total time in the Event Log's Security Log (newest event-oldest event); in Minutes. |
| SecurityLogStartDate | Time and date for the oldest item in the Event Log's security log. |
| TotalConsoleTime | Total number of console logon minutes recorded in the security log for all users |
| TotalConsoleUsers | Total number of unique console users recorded in the Event Log's Security Log. |
| TopConsoleUser | User with the largest number of console minutes. NULL if log is empty or TotalConsoleUsers is 0. |

System Console Users
Class Name: SMS_SystemConsoleUser
WMI Key: SystemConsoleUser

| Property (e.g., 231-234 in FIG. 2): | Description: |
|---|---|
| SystemConsoleUser | A user that has logged onto the console of the machine |
| TotalUserConsoleMinutes | The total number of console logon minutes recorded in the security log for this user |
| NumberOfConsoleLogons | The total number of logons recorded in the Security log for this user |
| LastConsoleUse | The last date-time this user logged off the system from the console |

Figure 3:
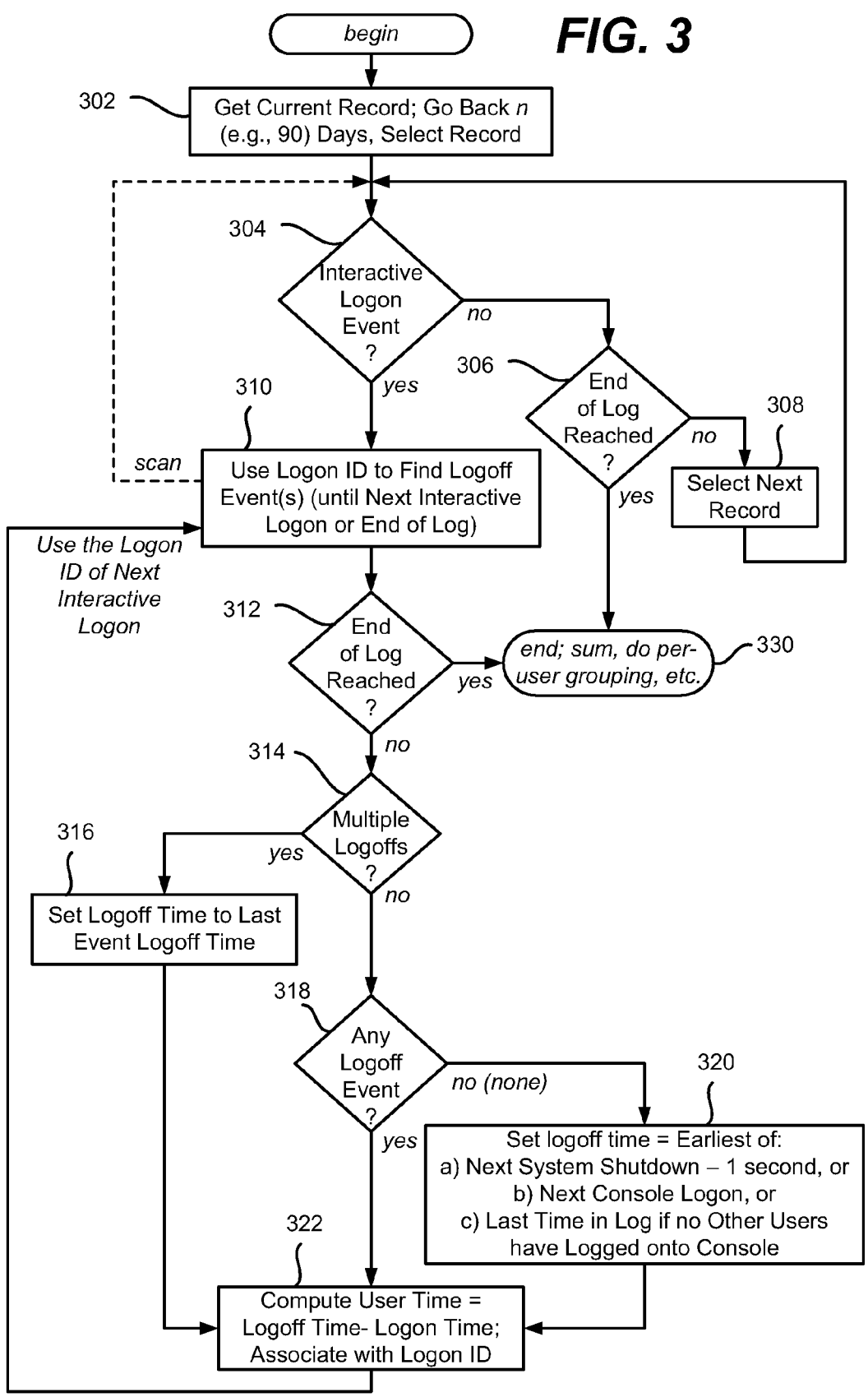
FIG. 3 is a flow diagram representing example steps taken to process events into usage data.

Turning to an explanation of the operation of the log processing, FIG. 3 is a flow diagram showing example steps that may be taken to accumulate user-ID based system usage information from an event log. In general, the event log processing mechanism 106 looks for logon events (e.g., event ID 528; Windows® Vista adds 4096 whereby the logon event ID is 4624) in the security event log 104, and in particular only considers interactive logins (e.g., Logon Type: Interactive [2], RemoteInteractive [10], CachedInteractive [11], and CachedRemoteInteractive [12]. Each logon event is associated with a user name and a logon ID.

In general, the process scans the security log forward from some point prior to the current record as represented by step 302. Note that some logs may be relatively (e.g., two or three years) long, whereby the scanning may only look back up to a configurable number of n days in the log, e.g., ninety days is the default in one implementation. Steps 304, 306 and 308 of FIG. 3 represent scanning, beginning at such a previous point looking for an appropriate interactive logon event. If the end of the log is reached when scanning forward in time, the process ends; in the event that there is no logon event found (e.g., the user has been logged on for over ninety days), the process may determine this last user by scanning further back in time.

When a logon event is found, the event log processing mechanism 106 uses the associated logon ID to look for (step 310) an associated logoff event, e.g., event 538 or 551, whichever comes last. In one example, the scanning may go forward until the next logon event is found, and if found, work back in time to the previous logoff event, if any. The scanning will also halt via step 312 if the end of the log is reached, e.g., corresponding to the current logon session.

If there is more than one logoff event (e.g., 538 or 551) for a given Logon ID, the last event is selected as represented by steps 314 and 316. Note that sometimes a user issues multiple logoff events before the logoff actually happens, whereby multiple logoff events may be logged. There may only be one such event depending on the logoff sequence.

If a (single) logoff event is found at step 318, it is used to compute the session time at step 322 as described below. If no logoff event is found at step 318, then shutdown events (e.g., events 512, 513) are used to determine the logoff time, if available, otherwise the logoff time is based on the next logon (e.g., for unexpected system crashes). More particularly, as represented by step 320, if a logon occurred and there is no corresponding logoff event, the logoff time is set to one second before the next system shutdown (events 512 or 513 in the event log), or set to the next console logon time, or set to the last time in the log if no other users have subsequently logged onto the console; the earliest of these three times is used.

At this point, the logon time and logoff time (actual or estimated) are known. Step 322 computes the time for this session and user by calculating the time difference. Note that depending on the application, a running total may be kept for each different user, or per-user data structures or the like may be kept for each user, e.g., for later summing. Further, a total session time may be kept as a running total, or determined from a sum of the various users' session times.

The process repeats until the end of the log is reached; (note that if the prior scanning was to the next logon, this next logon data is already known, whereby the process may loop back to step 310, otherwise the process may resume via step 304 from the next record). When the end of the log is reached, the current session may be computed as the last event (or current) time minus the logon time for the current user, as described above. To output a report 112 or the like, the total times for each user are individually summed (if a running total was not kept), as well as the total times for all users, and the users are sorted and/or grouped by total time (step 330).

Note that some computers are kiosks and/or are shared across work shifts and do not have a definitive primary user. Thus, the report(s) 112 may comprise a list of all (or some lesser number of) users that have logged onto the console, along with the amount of time each has been logged in. To determine whether there is a top primary user, a minimum threshold usage percentage may be used, e.g., for any user, the percent of console usage time by that user may be determined by:

TotalUserConsoleMinutes/TotalConsoleTime

In one example implementation, the primary user is the TopConsoleUser (set forth via the console usage class property) who exceeds a minimum threshold of system usage based on the percent of overall console usage. The asset manager/administrator can set the minimum threshold percent of console usage time as desired to establish what constitutes a primary user, (e.g., one suitable default equals sixty-six percent). In one example implementation, if this threshold is not met, the computer is considered a shared computer; although a TopConsoleUser may be displayed in reports, this user is not considered a primary user because the minimum threshold was not met.

Other aspects include that various types of reports may be run given the usage data. For example, rather than n (e.g., ninety) days from the present time, the report may be run for any length of time the log allows, and over any timeframe(s) within the log, which need not be contiguous. As another alternative, more and/or different selectivity with the types of logon (or logoff) events may be used rather than filtering to include only interactive logon events.

Further, the usage data may be combined with other data. For example, a report may show usage patterns by groups of users rather than individual users, e.g., by combining users based on otherwise obtained group data. Usage patterns from one system may be combined with usage patterns from one or more other systems, e.g., to determine a user's combined usage pattern across a network or sub-network of systems. Times of usage may be considered, e.g., to determine when a user is typically logged on. Other data such as which processes are run when a user is logged on may be detected and associated with logon-based usage data.

Exemplary Operating Environment

Figure 4:
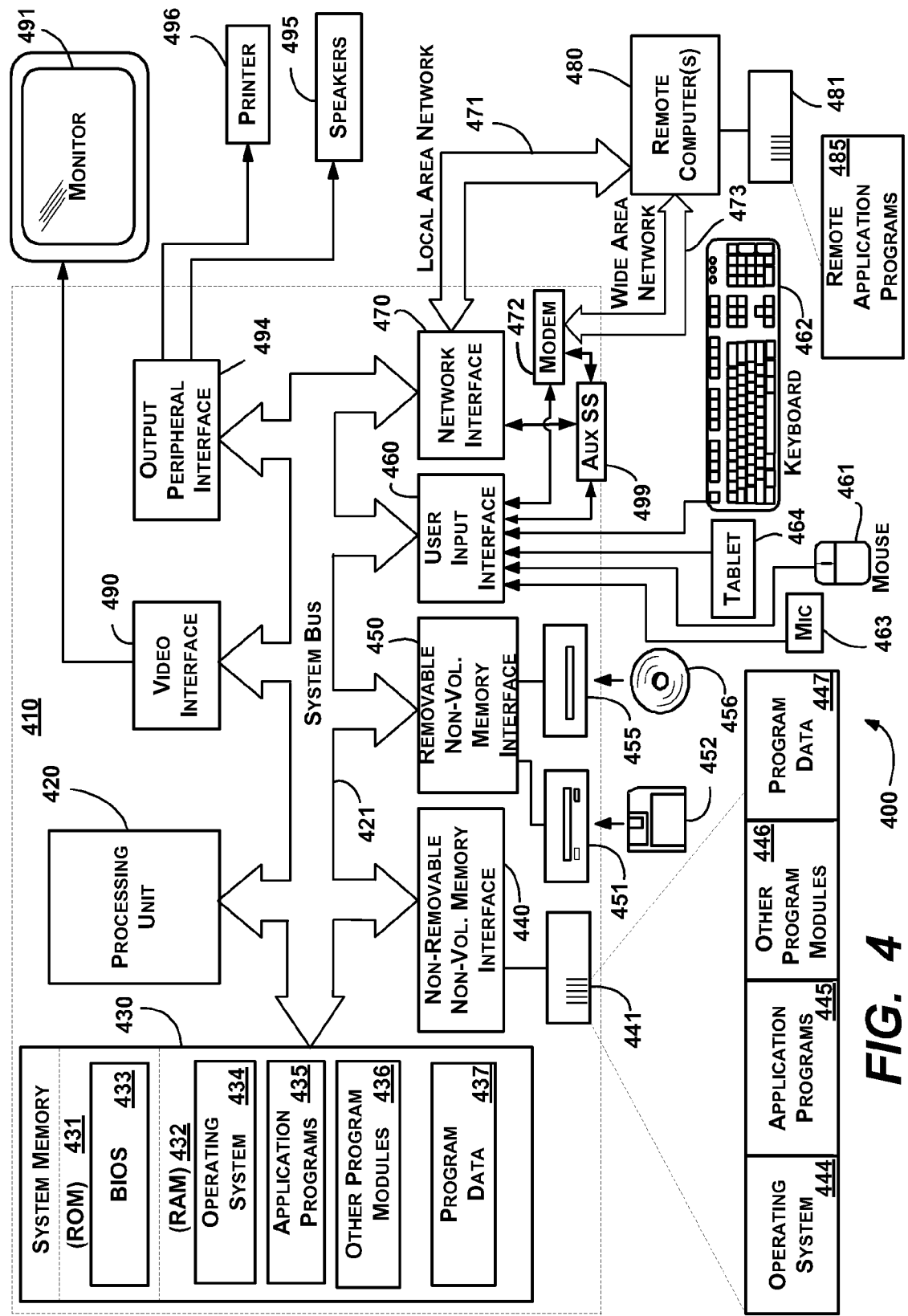
FIG. 4 shows an illustrative example of a computing environment into which various aspects of the present invention may be incorporated.

FIG. 4 illustrates an example of a suitable computing system environment 400 on which the examples of FIGS. 1-3 may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 4, an exemplary system for implementing various aspects of the invention may include a general purpose computing device in the form of a computer 410. Components of the computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 410 typically includes a variety of computer-readable media. Computer-readable media can be any available media that can be accessed by the computer 410 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 410. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436 and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media, described above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446 and program data 447. Note that these components can either be the same as or different from operating system 434, application programs 435, other program modules 436, and program data 437. Operating system 444, application programs 445, other program modules 446, and program data 447 are given different numbers herein to illustrate that, at a minimum, they are different copies. A user may enter commands and information into the computer 410 through input devices such as a tablet, or electronic digitizer, 464, a microphone 463, a keyboard 462 and pointing device 461, commonly referred to as mouse, trackball or touch pad. Other input devices not shown in FIG. 4 may include a joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. The monitor 491 may also be integrated with a touch-screen panel or the like. Note that the monitor and/or touch screen panel can be physically coupled to a housing in which the computing device 410 is incorporated, such as in a tablet-type personal computer. In addition, computers such as the computing device 410 may also include other peripheral output devices such as speakers 495 and printer 496, which may be connected through an output peripheral interface 494 or the like.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include one or more local area networks (LAN) 471 and one or more wide area networks (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460 or other appropriate mechanism. A wireless networking component 474 such as comprising an interface and antenna may be coupled through a suitable device such as an access point or peer computer to a WAN or LAN. In a networked environment, program modules depicted relative to the computer 410, or portions thereof, may be stored in the remote memory storage device. By way of example, and not limitation, FIG. 4 illustrates remote application programs 485 as residing on memory device 481. It may be appreciated that the network connections shown are exemplary and other means of establishing a communications link between the computers may be used.

An auxiliary subsystem 499 (e.g., for auxiliary display of content) may be connected via the user interface 460 to allow data such as program content, system status and event notifications to be provided to the user, even if the main portions of the computer system are in a low power state. The auxiliary subsystem 499 may be connected to the modem 472 and/or network interface 470 to allow communication between these systems while the main processing unit 420 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising, employing at least one processor to perform steps including, processing logged events to determine logon times and logoff times, using the logon times and logoff times to determine usage of the system, determining a total usage time representative of how long a plurality of users were logged onto the system, computing each user's time of being logged onto the system against the total usage time to determine a percentage for that user, and comparing the percentage for each user against a threshold percentage to determine whether any user is a primary user of the system.

2. The method of claim 1 wherein using the logon and logoff times to determine usage of the system comprises determining each user that logged onto the system by differentiating logons each corresponding to singular control of the computer system, and for each user, determining an amount of time that user was logged onto the system.

3. The method of claim 2 wherein determining the amount of time that each user was logged onto the system comprises, for each user, computing a difference value for each logon time and its corresponding logoff time, and summing each difference value for that user.

4. The method of claim 1 wherein processing the logged events to determine logon times and logoff times comprises selecting one logoff time of a plurality of logoff events corresponding to a single logon event.

5. The method of claim 1 wherein processing the logged events to determine logon times and logoff times comprises selecting the logoff time based on a next system shutdown time, a next console logon time, or a last logged time.

6. The method of claim 1 further comprising, determining a total usage time representative of how long a plurality of users were logged onto the system.

7. The method of claim 1 further comprising, providing data that identifies a plurality of users, and for each user, an amount of time that user was determined to have been logged onto the system.

8. The method of claim 1 further comprising determining that the system is a shared system when no user is determined to be a primary user.

9. In a computing environment, a system associated with a computing device, comprising:
a log configured to log events including logon events;
a log processing mechanism coupled to the log and configured to scan for a logon event associated with a logon time, to determine a corresponding logoff time, and to use the logon time and logoff time to determine usage data corresponding to the computing device for each user of the computing device and a total usage time for all users; and
a usage analysis component configured to determine, from the usage data, a primary user of the computing device, including by comparing the usage data for each respective user against the total usage time to determine a relative usage for the respective user, and comparing the relative usage for each user against a threshold usage to determine whether any user is a primary user of the system.

10. The system of claim 9 wherein the log comprises a security event log of a Windows®-based operating system.

11. The system of claim 9 further comprising a console usage class and console user class coupled to the log processing mechanism, the console usage class including properties corresponding to a plurality of users of the computing device, and the console usage class including properties corresponding to at least one of the users.

12. The system of claim 11 wherein the console usage class properties include total time data, oldest item data, total number of console logon time data, number of users data, or data identifying a user having a largest console time, or any combination of total time data, oldest item data, total number of console logon time data, number of users data, or data identifying a user having a largest console time.

13. The system of claim 11 wherein the console user class properties include data that identify a user, data representative of a total number of console logon minutes for the user, data representative of a total number of logons for the user, or data representative of a last logoff time for the user, or any combination of data that identify a user, data representative of a total number of console logon minutes for the user, data representative of a total number of logons for the user, or data representative of a last logoff time for the user.

14. The system of claim 9 further comprising a user interface for interacting with the usage data provided by the event log processing mechanism.

15. A hardware computer storage medium having computer-executable instructions stored thereon, which in response to execution by a computer, cause the computer to perform steps, comprising:
accessing logged event data;
scanning the logged event data to find a plurality of logon times, each logon time associated with a user of a plurality of users of a computing device;
determining logoff times corresponding to the logon times;
computing session times for each of the plurality of users based upon a difference of the logoff times and the logon times;
comparing the session times of each of the plurality of users to the total session times of all of the plurality of users, and
identifying a primary user of the computing device based, at least in part, on the comparing.

16. The hardware computer storage medium of claim 15 wherein determining the logoff times comprises finding at least one of a logoff event, a shutdown event, or another logon event.

17. The hardware computer storage medium of claim 15 having further computer-executable instructions stored thereon, which in response to execution by the computer, cause the computer to perform further steps comprising, determining a timeframe within the logged data to process, computing other session times within the timeframe for a particular user based upon differences of other logon and logoff times, and determining a summed user time for the particular user based upon a sum of the session time and the other session times.

18. The hardware computer storage medium of claim 17 having further computer-executable instructions stored thereon, which in response to execution by the computer, cause the computer to perform further steps comprising, computing at least one other summed user time corresponding to at least one other user.

19. The hardware computer storage medium of claim 18 having further computer-executable instructions stored thereon, which in response to execution by the computer, cause the computer to perform further steps comprising, determining the primary user based upon the summed user times of the particular user and each other user.

* * * * *